(12) United States Patent
Kim

(10) Patent No.: US 8,490,484 B2
(45) Date of Patent: Jul. 23, 2013

(54) APPARATUS FOR DRIVING GYROSCOPE SENSOR

(75) Inventor: Chang Hyun Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 274 days.

(21) Appl. No.: 12/960,978

(22) Filed: Dec. 6, 2010

(65) Prior Publication Data

US 2012/0031184 A1    Feb. 9, 2012

(30) Foreign Application Priority Data

Aug. 6, 2010    (KR) .................. 10-2010-0076073

(51) Int. Cl.
*G01C 19/56* (2012.01)

(52) U.S. Cl.
USPC ...................................... 73/504.12

(58) Field of Classification Search
USPC .............. 73/504.12, 504.04, 504.14, 504.15, 73/504.16, 504.02
See application file for complete search history.

(56) References Cited

U.S. PATENT DOCUMENTS

| | | | |
|---|---|---|---|
| 5,648,608 A * | 7/1997 | Nakamura ................. | 73/504.12 |
| 5,817,940 A * | 10/1998 | Kobayashi et al. ........ | 73/504.12 |
| 6,608,425 B2 * | 8/2003 | Ebara et al. ............... | 310/316.01 |
| 8,127,607 B2 * | 3/2012 | Sugibayashi ............. | 73/504.12 |
| 2010/0058862 A1 * | 3/2010 | Sugibayashi et al. ...... | 73/504.12 |
| 2010/0107759 A1 | 5/2010 | Kato | |
| 2011/0314911 A1 * | 12/2011 | Kim .......................... | 73/504.12 |

FOREIGN PATENT DOCUMENTS

| | | |
|---|---|---|
| JP | 3201135 B2 | 8/2001 |
| JP | 2002-267448 A | 9/2002 |
| JP | 2005-308530 A | 11/2005 |
| JP | 2006064613 A | 3/2006 |
| JP | 2007-221575 A | 8/2007 |
| JP | 2009-092583 A | 4/2009 |
| JP | 3159045 U | 4/2010 |
| JP | 2010-112790 A | 5/2010 |
| JP | 2011-099818 A | 5/2011 |
| KR | 20100029708 A | 3/2010 |
| KR | 1020100029708 A | 3/2010 |

OTHER PUBLICATIONS

Office Action corresponding to KR10-2010-0076073, dated Mar. 2, 2012.
Japanese Office Action issued on Sep. 11, 2012 in corresponding Japanese Patent Application No. 2010-285608.

* cited by examiner

*Primary Examiner* — Helen Kwok
(74) *Attorney, Agent, or Firm* — Lowe Hauptman Ham & Berner, LLP

(57) ABSTRACT

There is provided an apparatus for driving a gyroscope sensor, including: a detector detecting voltage corresponding to the deformation of a gyroscope sensor due to vibrations generated by a driving voltage supplied through a driving electrode and Coriolis force by using a detecting electrode; a phase shifter shifting the voltage from the detector by a preset phase to generate the driving voltage, in order to meet oscillation phase conditions; an inverter inverting the voltage from the phase shifter to generate the inverting voltage, in order to stop the driving of the gyroscope sensor; a selector selecting any one of the driving voltage from the phase shifter and the inverting voltage from the inverter; and an amplifier amplifying the driving voltage or the inverting voltage from the selector to a preset gain and supplying it to the driving electrode of the gyroscope sensor, in order to meet oscillation amplitude conditions.

11 Claims, 4 Drawing Sheets

APPARATUS FOR DRIVING GYROSCOPE SENSOR

CROSS-REFERENCE TO RELATED APPLICATIONS

This application claims the priority of Korean Patent Application No. 10-2010-0076073 filed on Aug. 6, 2010, in the Korean Intellectual Property Office, the disclosure of which is incorporated herein by reference.

BACKGROUND OF THE INVENTION

1. Field of the Invention

The present invention relates an apparatus for driving a gyroscope sensor usable in a mobile terminal, and more particularly, to an apparatus for driving a gyroscope sensor capable of rapidly stopping driving of a gyroscope sensor by driving it in a reverse direction during the driving thereof.

2. Description of the Related Art

Generally, a gyroscope sensor is a sensor that uses the Coriolis force (Fc) of vibrating objects to measure angular velocity.

In this case, the Coriolis force of the gyroscope sensor depends on the following Equation 1.

$$Fc = 2mV\Omega \qquad \text{Equation 1}$$

Where Fc: Coriolis force, m: mass, V: velocity, $\Omega$: angular velocity.

Referring to Equation 1, velocity V is generated by vibrating the gyroscope sensor with a driving signal to generate velocity V to measure the Coriolis force Fc. In this case, when the velocity V defined by the driving and the sensed Coriolis force Fc are known, the angular velocity $\Omega$ can be calculated, since a mass m is already known.

That is, since the angular velocity $\Omega$ is represented by 'Fc/2mV', the Coriolis force Fc is measured while the mass m of the object is driven at a constant velocity V, thereby making it possible to obtain the angular velocity $\Omega$.

In particular, the Coriolis force Fc, the velocity V, and the angular velocity V are a vector in a vertical direction therebetween. For example, in order to obtain an angular velocity $\Omega z$ in a z direction, a Coriolis force Fc_y in a y direction may be measured by giving a velocity Vx in an X direction. In addition, in order to measure angular velocities $\Omega x$ and $\Omega y$ in x and y directions, Coriolis forces Fc_y and Fc_x in y and x directions may be measured by giving a velocity Vz in a z direction.

That is, in order to measure angular velocities in several directions, the vibrational direction of the vibrating object should be changed, and in order to increase a measuring frequency bandwidth of an angular velocity, a sampling rate should be increased.

For example, in order to obtain the measuring frequency bandwidth of 0 to 100 Hz, the sampling should be performed 200 times for at least 1 second.

Generally, the gyroscope sensor drives an object in a z-axis by vibrating the object having a high quality factor Qs, thereby measuring the angular velocity in the x and y axes. Thereafter, the gyroscope sensor drives the object in the x-axis direction by changing the movement of the object in order to measure a z-axis, thereby needing the driving stopping time for changing the direction.

However, the apparatus for driving the gyroscope sensor according to the related art does not include special technical apparatuses for stopping the gyroscope sensor during the driving of the gyroscope sensor, such that stopping the gyroscope sensor during the driving of the gyroscope sensor is time consuming. As a result, the apparatus for driving the gyroscope sensor according to the related art has a long settling time, such that it is not suitable to apply to a multi-axis gyroscope sensor.

SUMMARY OF THE INVENTION

An aspect of the present invention provides an apparatus for driving a gyroscope sensor capable of rapidly stopping driving of a gyroscope sensor by driving it in a reverse direction during the driving thereof, rapidly performing an axis change of a multi-axis gyroscope sensor, and rapidly performing multi-axis sensing.

According to an aspect of the present invention, there is provided an apparatus for driving a gyroscope sensor, including: a detector detecting voltage corresponding to deformation of a gyroscope sensor due to vibrations generated by a driving voltage supplied through a driving electrode and a Coriolis force by using a detecting electrode; a phase shifter shifting the voltage from the detector by a preset phase to generate the driving voltage, in order to meet oscillation phase conditions; an inverter inverting the voltage from the phase shifter to generate the inverting voltage, in order to stop the driving of the gyroscope sensor; a selector selecting any one of the driving voltage from the phase shifter and the inverting voltage from the inverter; and an amplifier amplifying the driving voltage or the inverting voltage from the selector to a preset gain and supplying it to the driving electrode of the gyroscope sensor, in order to meet oscillation amplitude conditions.

According to another aspect of the present invention, there is provided an apparatus for driving a gyroscope sensor, including: a detector detecting voltage corresponding to deformation of a gyroscope sensor due to vibrations generated by a driving voltage supplied through a driving electrode and a Coriolis force by using a detecting electrode; a phase shifter shifting the voltage from the detector by a preset phase to generate the driving voltage, in order to meet oscillation phase conditions; an inverter inverting the voltage from the phase shifter to generate the inverting voltage, in order to stop the driving of the gyroscope sensor; a selector selecting any one of the driving voltage from the phase shifter and the inverting voltage from the inverter; an amplifier amplifying the driving voltage or the inverting voltage from the selector to a preset gain and supplying it to the driving electrode of the gyroscope sensor, in order to meet oscillation amplitude conditions; and a controller providing switching control signals to the selector.

The controller provides the switching control signal for selecting the driving voltage to the selector during the driving and provides the switching control signal for selecting the inverting voltage to the selector when stopping the driving.

The detector includes a first detecting circuit unit detecting voltage through a first detecting electrode of the gyroscope sensor outputting differential signals, a second detecting circuit unit detecting voltage through a second detecting electrode of the gyroscope sensor, and a differential amplifying circuit unit differentially amplifying the voltage from the first detecting circuit unit and the voltage from the second detecting circuit unit.

The phase shifter sets a shifted phase of a signal to 180° so as to meet oscillation conditions in a signal path including the gyroscope sensor, the detector, the phase shifter, the selector, and the amplifier.

The amplifier includes a first amplifying circuit unit amplifying the driving voltage or the inverting voltage from the selector to the preset gain and supplying it to the first driving electrode of the gyroscope sensor, and a second amplifying circuit unit amplifying the driving voltage or the inverting voltage from the selector to the predetermined gain and supplying it to the second driving electrode of the gyroscope sensor.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
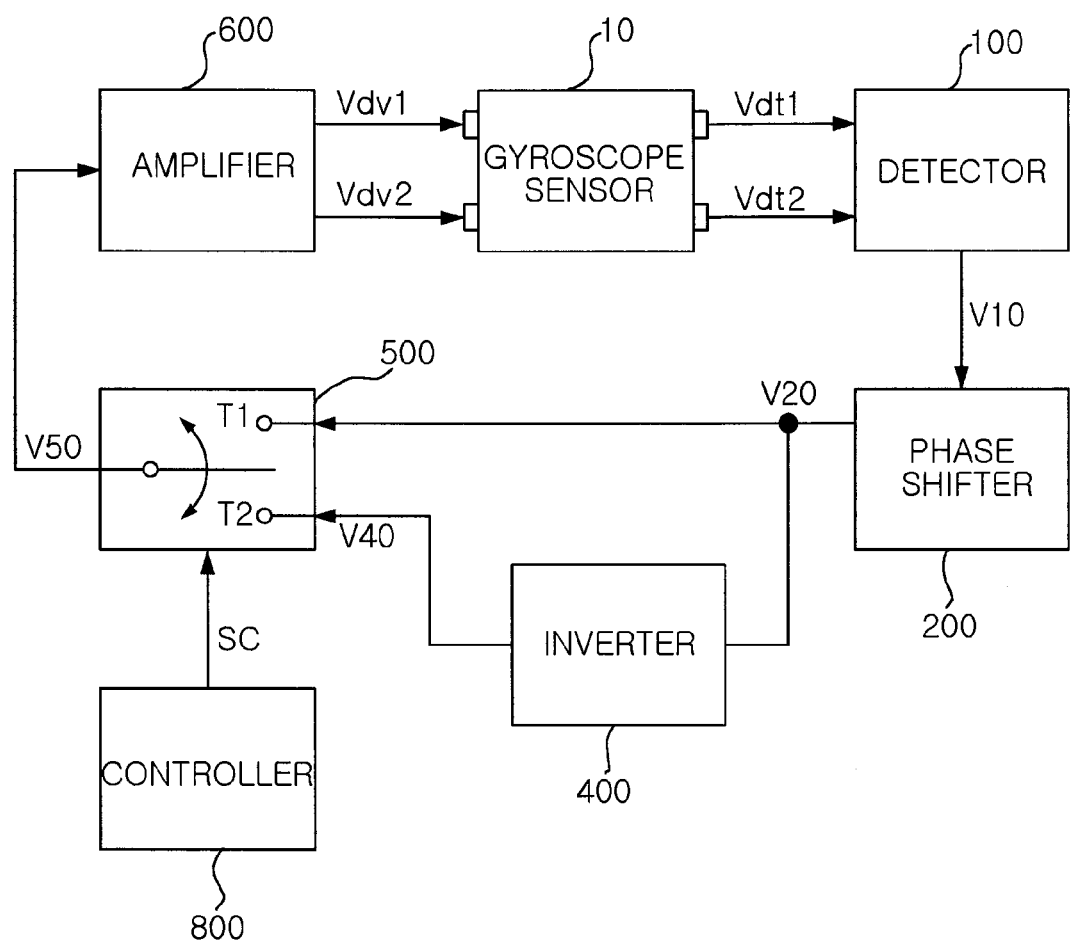
FIG. 1 is a block diagram showing an apparatus for driving a gyroscope sensor according to a first exemplary embodiment of the present invention.

Exemplary embodiments of the present invention will now be described in detail with reference to the accompanying drawings.

The present invention should not be limited to the embodiments set forth herein and the embodiments may be used to assist in understanding the technical idea of the present invention. Like reference numerals designate like components having substantially the same constitution and function in the drawings of the present invention.

FIG. 1 is a block diagram showing an apparatus for driving a gyroscope sensor according to a first exemplary embodiment of the present invention.

Referring to FIG. 1, an apparatus for driving a gyro sensor according to a first exemplary embodiment of the present invention may include a detector 100 that detects voltage corresponding to deformation of the gyroscope sensor 10 due to the vibrations generated by a driving voltage supplied through a driving electrode and a Coriolis force by using the detecting electrode.

The apparatus for driving the gyro sensor according to the first exemplary embodiment of the present invention may include a phase shifter 200 that shifts the voltage from the detector 100 by a preset phase to generate a driving voltage, in order to meet oscillation phase conditions.

The apparatus for driving the gyroscope sensor according to the first exemplary embodiment of the present invention may include an inverter 400 that inverts the voltage from the phase shifter 200 to generate the inverting voltage, in order to stop the driving of the gyroscope sensor 10.

The apparatus for driving the gyroscope sensor according to the first exemplary embodiment of the present invention may include a selector 500 that selects any one of the driving voltage from the phase shifter 200 and the inverting voltage from the inverter 400.

The apparatus for driving the gyroscope sensor according to the first exemplary embodiment of the present invention includes an amplifier 600 that amplifies the driving voltage or the inverting voltage from the selector 500 to a preset gain and supplies it to the driving electrode of the gyroscope sensor 10, in order to meet oscillation amplitude conditions.

The driving for driving the gyroscope sensor according to the first exemplary embodiment of the present invention may include a controller 800 that provides switching control signals to the selector 500.

The controller 800 may be configured to provide the switching control signals for selecting the driving voltage to the selector 500 during the driving of the gyroscope sensor and the switching control signals for selecting the inverting voltage to the selector 500 when the gyroscope sensor is driven.

Figure 2:
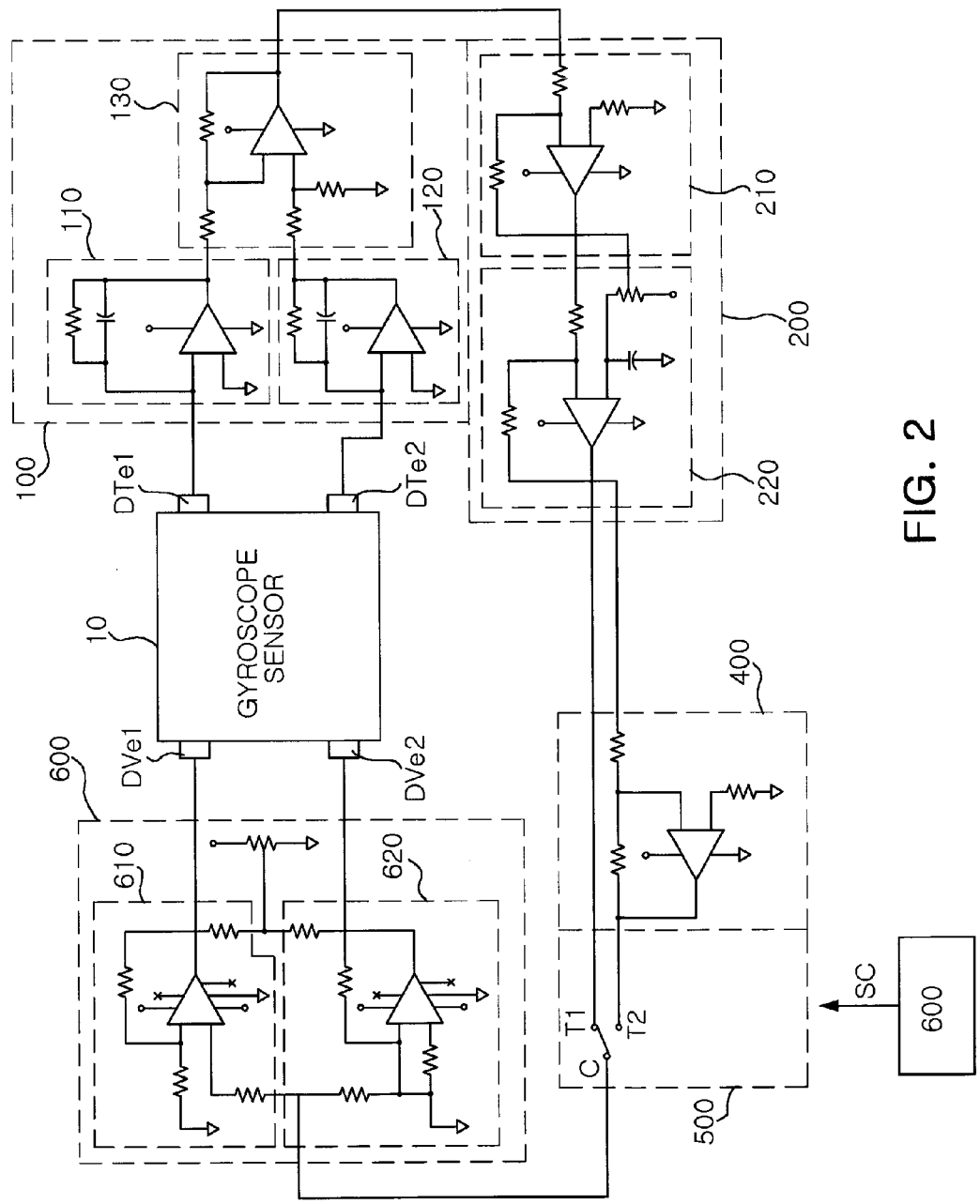
FIG. 2 is a circuit diagram showing the apparatus for driving the gyroscope sensor according to the first exemplary embodiment of the present invention.

FIG. 2 is a circuit diagram showing the apparatus for driving the gyroscope sensor according to the first exemplary embodiment of the present invention.

Referring to FIG. 2, the detector 100 may include a first detecting circuit unit 110 that detects voltage by using a first detecting electrode DTe1 of the gyroscope sensor 10 outputting differential signals, a second detecting circuit unit 120 that detects voltage by using a second detecting electrode DTe2 of the gyroscope sensor 10, and a differential amplifying circuit unit 130 that differentially amplifies the voltage from the first detecting circuit unit 110 and the voltage from the second detecting circuit unit 120.

The phase shifter 200 may be configured to set a shifted phase of a signal to 180° so as to meet the oscillation conditions in a signal path including the gyroscope sensor 10, the detector 100, the phase shifter 200, the selector 500, and the amplifier 600.

The amplifier 600 may include a first amplifying circuit unit 610 that amplifies the driving voltage or the inverting voltage from the selector 500 to the preset gain and supplies it to a first driving electrode DVe1 of the gyroscope sensor 10 and a second amplifying circuit unit 620 that amplifies the driving voltage or the inverting voltage from the selector 500 to the preset gain and supplies it to a second driving electrode DVe2 of the gyroscope sensor 10.

Figure 3:
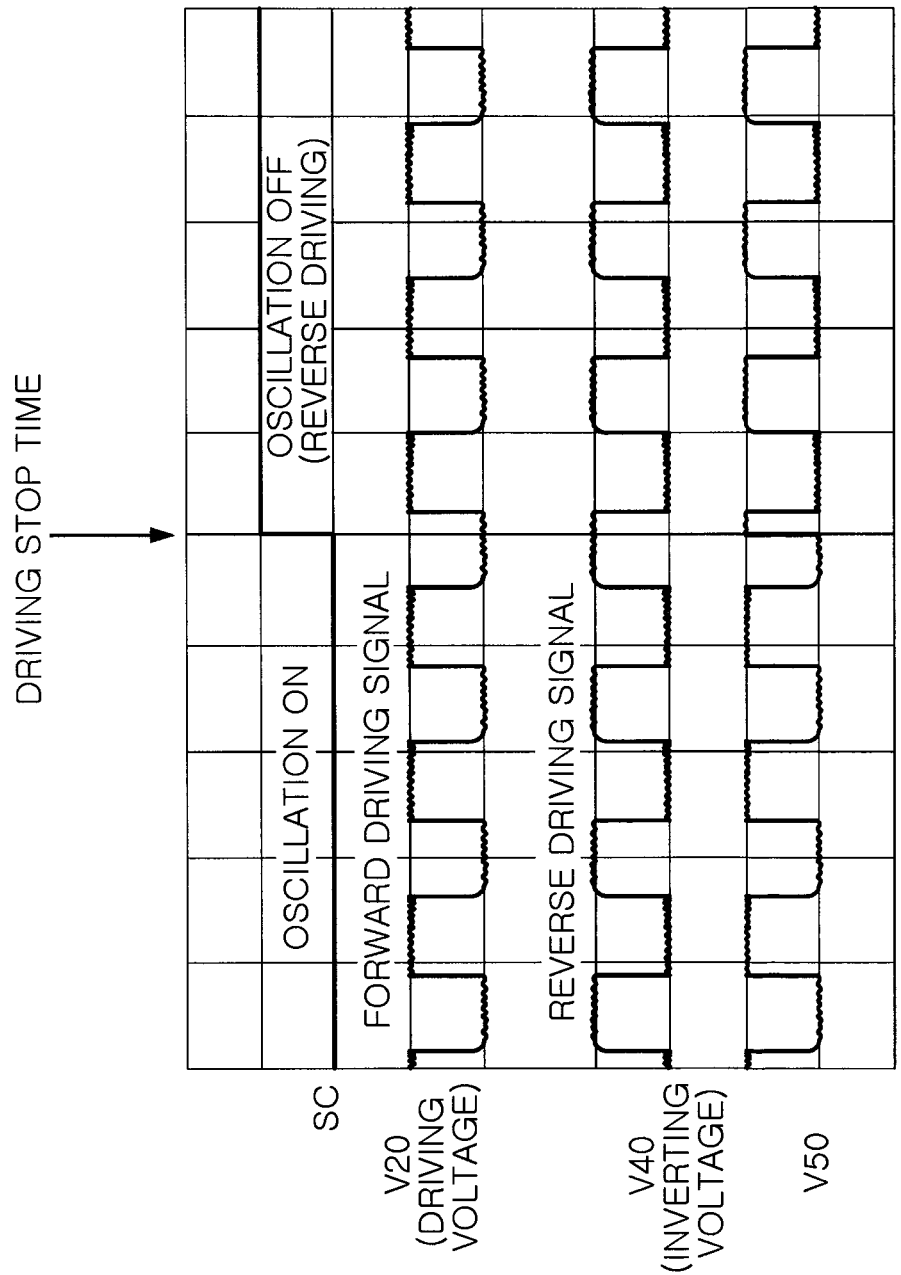
FIG. 3 is waveform diagrams of main signals according to the present invention.

FIG. 3 is waveform diagrams of main signals according to the present invention. In FIG. 3, SC is a switching control signal provided from the controller 800 to the selector 500, wherein SC1 is a switching control signal for selecting the driving voltage and SC2 is a switching control signal for selecting the inverting voltage. In addition, V20 is the driving voltage output from the phase shifter 200 and V40 is the inverting voltage output from the inverter 400.

Figure 4A:
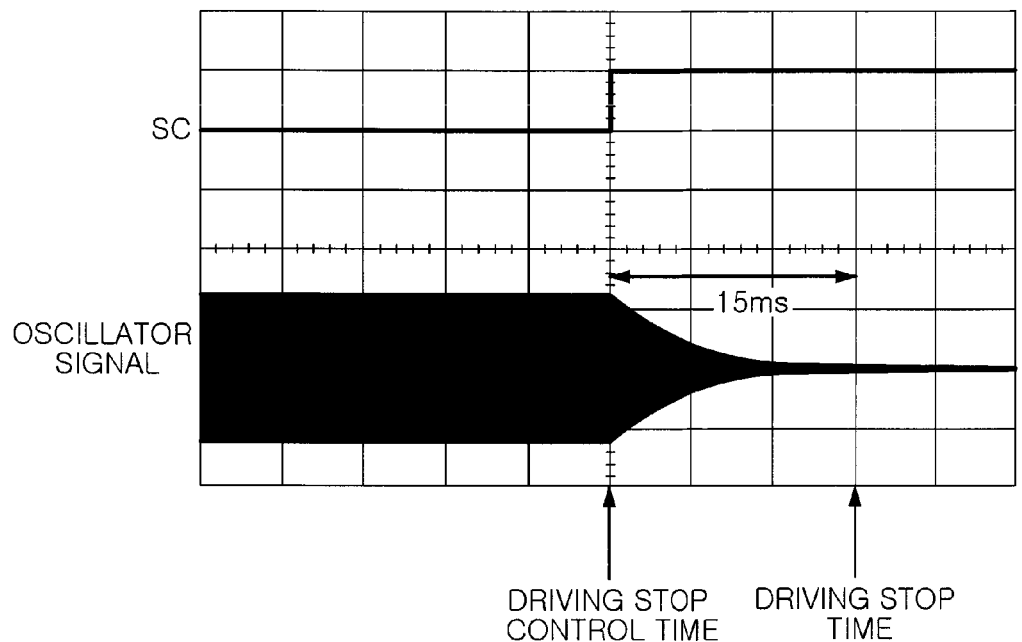
FIGS. 4A and 4B are a diagram showing oscillation characteristics of the present invention.
Figure 4B:
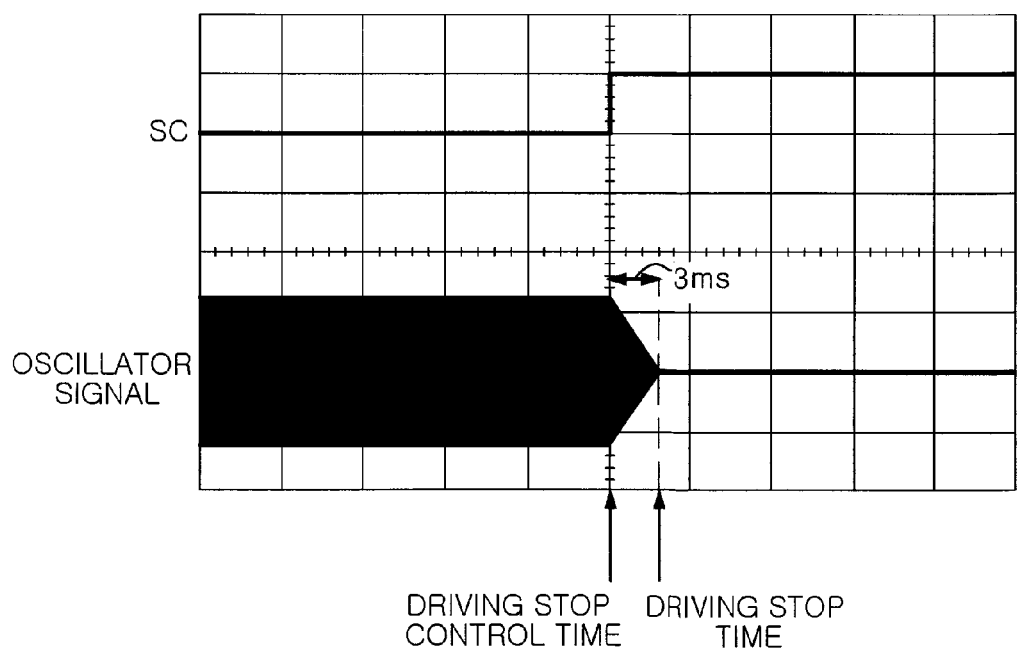

FIGS. 4A and 4B are a diagram showing the oscillation characteristics of the present invention. FIGS. 4A and 4B are a diagram for comparing a case in which the inverting voltage is not used with a case in which the inverting voltage is used, wherein the upper figure shows the oscillation characteristics corresponding to the case in which there is no reverse driving and the lower figure shows the oscillation characteristics corresponding to a case in which the reverse direction is performed.

Hereinafter, the operations and effects of the present invention will be described in detail with reference to the accompanying drawings.

The apparatus for driving the gyroscope sensor according to the first exemplary embodiment of the present invention will now be described with reference to FIGS. 1 to 4. In FIG. 1, the apparatus for driving the gyroscope sensor according to the first exemplary embodiment of the present invention is a feedback circuit for self-oscillation necessary to drive the gyroscope sensor 10 and may include the detector 100 for detecting the driving of the sensor, the phase shifter 200 for converting a phase of an arc detected by the detector 100, and the amplifier 600 for amplifying signals.

As such, the apparatus for driving the gyroscope sensor according to the first exemplary embodiment of the present invention drives the gyroscope sensor 10.

Referring to FIGS. 1 and 2, the gyroscope sensor 10 generates vibrations by driving voltages Vdv1 and Vdv2 supplied through the driving electrodes Dve1 and DVe2 and may output voltage corresponding to the deformation generated in the gyroscope sensor 10 by the vibrations and the Coriolis force through the detecting electrodes DTe1 and DTe2.

The detector 100 according to the first exemplary embodiment of the present invention detects the voltages output from the detecting electrodes DTe1 and DTe2 of the gyroscope sensor 10 to provide detecting voltages Vdt1 and Vdt2 to the phase to the phase shifter 200.

As shown in FIG. 3, the phase shifter 200 according to the first exemplary embodiment of the present invention may include a phase shifter 200 that may shift the voltage from the detector 100 by the preset phase to generate the driving voltage V20, in order to meet the oscillation phase conditions.

As shown in FIG. 3, the inverter 400 according to the first exemplary embodiment of the present invention inverts the voltage from the phase shifter 200 to generate the inverting voltage V40, in order to stop the driving of the gyroscope sensor 10.

In this case, the inverting voltage V40 has a voltage having a phase difference of 180° from the driving voltage V20 output from the phase shifter 200, which is voltage for stopping the driving.

As shown in FIG. 3, the selector 500 according to the first exemplary embodiment of the present invention may select any one of the driving voltage V20 from the phase shifter 200 and the inverting voltage from the inverter 400.

For example, the selector 500 may select the driving voltage V20 from the phase shifter 200 in order to drive the gyroscope sensor 10.

Unlike this, the selector 500 may select the inverting voltage V40 from the inverter 400 in order to stop the driving of the gyroscope sensor 10. In other words, when stopping the self-oscillation of the gyroscope sensor 10, the gyroscope sensor 10 is driven in a reverse direction with the inverting signal V40 having the phase difference of 180° from the previously supplied driving signal V20 by using the inverter 400, thereby rapidly stopping the driving of the gyroscope sensor 10.

The reverse driving may be performed for a very short time in order to remove the unexpected oscillation due to the characteristics of the gyroscope sensor 10, the magnitude of the reverse signal may be controlled to control the driving stopping time.

The amplifier 600 according to the first exemplary embodiment of the present invention amplifies a voltage V50, i.e., the driving voltage V20 or the inverting voltage V40 from the selector 500 to the preset gain and supplies it to the driving electrode of the gyroscope sensor 10, in order to meet oscillation amplitude conditions.

The controller 800 according to the first exemplary embodiment of the present invention may provide the switching control signal SC to the selector 500.

In other words, the controller 800 may provide the switching control signal for selecting the driving voltage V20 to the selector 500 during the driving of the gyroscope sensor and the switching control signal SC for selecting the inverting voltage V40 to the selector 500 when the gyroscope sensor stops.

As a result, the selector 500 may select the driving voltage V20 or the inverting voltage V40 according to the switching control signal SC.

The detector 100 will now be described with reference to FIG. 2.

Referring to FIG. 2, the detector 100 may include, for example, the first detecting circuit unit 110, the second detecting circuit unit 120, and the differential amplifying circuit unit 130.

In this configuration, the first detecting circuit unit 110 may detect the voltage through the first detecting electrode DTe1 of the gyroscope sensor 10 outputting the differential signals.

The second detecting circuit unit 120 may detect the voltage through the second detecting electrode DTe2 of the gyroscope sensor 10.

The differential amplifying circuit unit 130 may differentially amplify the voltage from the first detecting circuit unit 110 and the voltage from the second detecting circuit unit 120.

In addition, the phase shifter 200 may set the shifted phase of the signal to 180° so as to meet the oscillation conditions in a signal path including the gyroscope sensor 10, the detector 100, the phase shifter 200, the selector 500, and the amplifier 600.

For example, when the phase shift of the signal is 90° in the signal path including the gyroscope sensor 10, the detector 100, the phase shifter 200, the selector 500, and the amplifier 600, the phase shifter 200 may set the phase shift to 90°.

In other words, the conditions for resonating the gyroscope sensor 10 driven by the apparatus for driving the gyroscope sensor according to the present invention are that the phase of the open-loop is 180° and the gain of the signal is 1. The driving voltage passes through the gyroscope sensor 10 to generate the phase delay by −90°. In this case, the phase shifter 200 and the amplifier 600 meet the resonance conditions so that the gyroscope sensor 10 performs the self-oscillation.

In addition, referring to FIG. 1, when the amplifier 600 includes, for example, the first amplifying circuit unit 610 and the second amplifying circuit unit 620, the first amplifying circuit unit 610 may amplify the driving voltage or the inverting voltage from the selector 500 to the preset gain and supply it to the first driving electrode DVe1 of the gyroscope sensor 10.

The second amplifying circuit unit 620 may amplify the driving voltage or the inverting voltage from the selector 500 to the predetermined gain and supply it to the second driving electrode DVe2 of the gyroscope sensor 10.

Referring to FIG. 4A, when the reverse driving is not used, the braking time consumed from the driving stop control time to the real driving stopping time is as long as approximately 15 ms. Therefore, in the above-mentioned case, since the braking time for changing an axis in a multi-axis gyroscope sensor is long, there is a problem in that the measuring time is long.

On the other hand, referring to FIG. 4B, when using the reverse driving using the inverting voltage provided from the inverter of the present invention, the braking time from the driving stop control time to the real driving stopping time is relatively very short, approximately 3 ms. Therefore, according to the present invention, since the braking time for changing the axis in the multi-axis gyroscope sensor is short, the axis changing may be relatively rapidly made.

In the present invention, the self-oscillation may stop in the case in which the self-oscillation of the gyroscope sensor stops by the reverse driving than the case in which the reverse driving is not performed For example, the stopping time is 15 ms before the inverting driving is not used, while the stopping time may be shortened to 3 ms when the inverting driving is used.

The apparatus for driving the gyroscope sensor according to the present invention can easily optionally change the driving direction of the gyroscope sensor and more rapidly perform the sampling, when measuring the multi-axis by the multi-axis gyroscope sensor.

As set forth above, the present invention can rapidly stop the driving of the gyroscope sensor by driving it in a reverse direction during the driving thereof, rapidly perform the axis change of the multi-axis gyroscope sensor, rapidly perform the multi-axis sensing, and reduce cross-talk due to unwanted vibrations.

That is, the present invention can obtain the high measuring frequency bandwidth by minimizing the stopping time and minimize cross-talk due to unwanted vibrations, when performing the multi-axis sensing using the gyroscope sensor.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for driving a gyroscope sensor, the apparatus comprising:
    a detector configured to detect a detecting voltage corresponding to deformation of a gyroscope sensor due to vibrations generated by a first driving voltage supplied through at least one driving electrode of the gyroscope sensor and a Coriolis force;
    a phase shifter configured to shift the detecting voltage from the detector by a preset phase to generate a second driving voltage, in order to meet oscillation phase conditions;
    an inverter configured to invert the second driving voltage from the phase shifter to generate an inverting voltage, in order to stop the driving of the gyroscope sensor;
    a selector configured to select any one of the second driving voltage from the phase shifter and the inverting voltage from the inverter; and
    an amplifier configured to amplify the selected second driving voltage or inverting voltage with a preset gain and to supply the amplified second driving voltage or inverting voltage to the at least one driving electrode of the gyroscope sensor, in order to meet oscillation amplitude conditions.

2. The apparatus of claim 1, wherein the detector includes:
    a first detecting circuit unit configured to detect a first voltage by using a first detecting electrode of the gyroscope sensor outputting differential signals;
    a second detecting circuit unit configured to detect a second voltage by using a second detecting electrode of the gyroscope sensor; and
    a differential amplifying circuit unit configured to differentially amplify the first voltage from the first detecting circuit unit and the second voltage from the second detecting circuit unit.

3. The apparatus of claim 2, wherein the phase shifter is configured to set a phase shift of a signal in a signal path including the gyroscope sensor, the detector, the phase shifter, the selector, and the amplifier to 180° so as to meet the oscillation phase conditions.

4. The apparatus of claim 3, wherein
    the at least one driving electrode of the gyroscope sensor comprises a first driving electrode and a second driving electrode, and
    the amplifier includes:
        a first amplifying circuit unit configured to amplify the selected second driving voltage or inverting voltage with the preset gain and to supply the amplified second driving voltage or inverting voltage to the first driving electrode of the gyroscope sensor; and
        a second amplifying circuit unit configured to amplify the selected second driving voltage or inverting voltage with the preset gain and to supply the amplified second driving voltage or inverting voltage to the second driving electrode of the gyroscope sensor.

5. An apparatus for driving a gyroscope sensor, the apparatus comprising:
    a detector configured to detect a detecting voltage corresponding to deformation of a gyroscope sensor due to vibrations generated by a first driving voltage supplied through at least one driving electrode of the gyroscope sensor and a Coriolis force;
    a phase shifter configured to shift the detecting voltage from the detector by a preset phase to generate a second driving voltage, in order to meet oscillation phase conditions;
    an inverter configured to invert the second driving voltage from the phase shifter to generate an inverting voltage, in order to stop the driving of the gyroscope sensor;
    a selector configured to select any one of the second driving voltage from the phase shifter and the inverting voltage from the inverter;
    an amplifier configured to amplify the selected second driving voltage or inverting voltage with a preset gain and to supply the amplified second driving voltage or inverting voltage to the at least one driving electrode of the gyroscope sensor, in order to meet oscillation amplitude conditions; and
    a controller configured to provide switching control signals to the selector.

6. The apparatus of claim 5, wherein the controller is configured to provide to the selector
    a first switching control signal for selecting the second driving voltage during the driving of the gyroscope sensor, and
    a second switching control signal for selecting the inverting voltage when stopping the driving of the gyroscope sensor.

7. The apparatus of claim 6, wherein the detector includes:
    a first detecting circuit unit configured to detect a first voltage through a first detecting electrode of the gyroscope sensor outputting differential signals;
    a second detecting circuit unit configured to detect a second voltage through a second detecting electrode of the gyroscope sensor; and
    a differential amplifying circuit unit configured to differentially amplify the first voltage from the first detecting circuit unit and the second voltage from the second detecting circuit unit.

8. The apparatus of claim 7, wherein the phase shifter is configured to set a phase shift of a signal in a signal path including the gyroscope sensor, the detector, the phase shifter, the selector, and the amplifier to 180° so as to meet oscillation phase conditions.

9. The apparatus of claim 8, wherein
    the at least one driving electrode of the gyroscope sensor comprises a first driving electrode and a second driving electrode, and
    the amplifier includes:
        a first amplifying circuit unit configured to amplify the selected second driving voltage or inverting voltage with the preset gain and to supply the amplified second driving voltage or inverting voltage to the first driving electrode of the gyroscope sensor; and a second amplifying circuit unit configured to amplify the selected second driving voltage or inverting voltage with the preset gain and to supply the amplified second driving voltage or inverting voltage to the second driving electrode of the gyroscope sensor.

10. The apparatus of claim 1, wherein the amplifier is configured to control a time for stopping the driving of the gyroscope sensor by controlling a magnitude of the inverting voltage.

11. The apparatus of claim 5, wherein the amplifier is configured to control a time for stopping the driving of the gyroscope sensor by controlling a magnitude of the inverting voltage.

* * * * *